United States Patent
Tonet et al.

(10) Patent No.: US 10,991,169 B2
(45) Date of Patent: Apr. 27, 2021

(54) METHOD FOR DETERMINING A MEAN TIME TO FAILURE OF AN ELECTRICAL DEVICE

(71) Applicant: SCHNEIDER ELECTRIC INDUSTRIES SAS, Rueil Malmaison (FR)

(72) Inventors: Richard Tonet, Le Rouret (FR); Pierre Gohl, Saint Paul (FR)

(73) Assignee: SCHNEIDER ELECTRIC INDUSTRIES SAS, Rueil Malmaison (FR)

( * ) Notice: Subject to any disclaimer, the term of this patent is extended or adjusted under 35 U.S.C. 154(b) by 244 days.

(21) Appl. No.: 15/750,556

(22) PCT Filed: Jul. 20, 2016

(86) PCT No.: PCT/EP2016/067232
§ 371 (c)(1),
(2) Date: Feb. 6, 2018

(87) PCT Pub. No.: WO2017/029053
PCT Pub. Date: Feb. 23, 2017

(65) Prior Publication Data
US 2019/0012846 A1  Jan. 10, 2019

(30) Foreign Application Priority Data

Aug. 20, 2015 (FR) .................................. 15 57818

(51) Int. Cl.
*G07C 3/00* (2006.01)
*G06F 11/00* (2006.01)
*G06F 1/26* (2006.01)

(52) U.S. Cl.
CPC ............... *G07C 3/00* (2013.01); *G06F 1/26* (2013.01); *G06F 11/008* (2013.01)

(58) Field of Classification Search
CPC ..................... H01H 2071/44; G01R 31/3274
See application file for complete search history.

(56) References Cited

U.S. PATENT DOCUMENTS

| 7,627,452 B2 * | 12/2009 | Albrecht | G05B 23/0283 340/679 |
| 2003/0137194 A1 | 7/2003 | White et al. | |
| 2009/0096405 A1 * | 4/2009 | Flickinger | G01R 31/343 318/565 |
| 2013/0073257 A1 * | 3/2013 | Williams | G01R 31/3274 702/179 |

OTHER PUBLICATIONS

Professor Ravi K. Iyer, Expectation and Variance / Examples and Computation of Mean Time to Failure, ECE 313 Probability with Engineering Applications Lecture 28—Dec. 6, 1999 (Year: 1999).*

(Continued)

*Primary Examiner* — Matthew G Marini
(74) *Attorney, Agent, or Firm* — Oblon, McClelland, Maier & Neustadt, L.L.P.

(57) ABSTRACT

A method for determining a mean time to failure of an electrical device, and a method for adjusting a predetermined mean time to failure of an electrical power supply and for evaluating the adjusted mean time to failure. The method determines the mean time to failure by taking into account both operating conditions and operational load.

8 Claims, 5 Drawing Sheets

(56) References Cited

OTHER PUBLICATIONS

International Search Report dated Sep. 5, 2016, in PCT/EP2016/067232 filed Jul. 20, 2016.
Ron Weglinski, "Highly Accelerated Stress Screening for Air-Cooled Switching Power Supplies", White Paper: TW0058, Feb. 1, 2007, XP055295653, 16 pages.
Franck Bayle et al., "Temperature Acceleration Models in Reliability Predictions: Justification & Improvements", Reliability and Maintainability Symposium (RAMS). IEEE, Jan. 25, 2010, XP031658007, 6 pages.
Firas Obeidat et al., "Reliability Prediction of PV Inverters Based on MIL-HDBK-217F N2", IEEE $42^{nd}$ Photovoltaic Specialist Conference (PVSC), IEEE, Jun. 14, 2015, XP032829507, 6 pages.

* cited by examiner

METHOD FOR DETERMINING A MEAN TIME TO FAILURE OF AN ELECTRICAL DEVICE

The present invention relates to a method for determining a mean time to failure of an electrical device, and more in particular to a method for adjusting a predetermined mean time to failure of an electrical power supply and for evaluating the adjusted mean time to failure.

BACKGROUND

Multiple methods are known for determining the mean time to failure of an electrical device, commonly referred to as MTTF for "Mean Time To Failure". In particular this information is very important to improve predictions on the lifetime of a device and to anticipate its maintenance or replacement. This information is especially important for electrical equipment whose proper functioning is essential for the performance of an industrial process. This is the case for example of the electrical power supply modules used in programmable logic. The power supply module is in effect a key component of a programmable controller and it is necessary to have permanently an understanding of its operating life before failure to anticipate maintenance or replacement, whether permanent or temporary.

SUMMARY OF INVENTION

It is an object of the invention to enhance the predictive accuracy of a method for determining a mean time to failure of an electrical appliance. The method is particularly well suited for an electrical power supply module for Programmable Logic Controller. This is achieved by providing a method that determines the mean time to failure by taking into account both the operating conditions and operational load.

In one aspect, the method includes:
determining a mean temperature value (AOTj) at which the electrical device has operated during an operational time;
determining a temperature range in which the determined mean temperature value (AOTj) is located, said range having a first (upper) temperature value which corresponds to a first predetermined value of mean time to failure and a second (lower) temperature value which corresponds to a second predetermined value of mean time to failure;
determining an adjusted mean time to failure time (MTTF) of the electrical device based on said mean temperature value (AOTj), said first (upper) value of the temperature range, said second (lower) value of the temperature range, said first predetermined value of mean time to failure and said second predetermined value of mean time to failure.

In this manner, the mean time to failure is adjusted for external temperature operating conditions of the electrical device In one further aspect, the method further includes:
determining a compensated operational time based on operational time and actual load of the electrical device; and
comparing the compensated operational time to the adjusted mean time to failure; and/or
determining a time difference between the adjusted mean time to failure and the compensated operational time In this manner, predictive accuracy of the operational time as indicator of age is enhanced as the actual electrical load of the electrical device is taken into account.

According to one aspect, determining the adjusted mean time to failure includes applying the following expression:

$$MTTF_i = MTTF_{Tx} - (MTTF_{Tx} - MTTF_{Ty}) * \frac{(AOT_j - Tx)}{(Ty - Tx)}$$

wherein:
Tx is the second (lower) value of the temperature range;
Ty is to the first (upper) value of the temperature range;
AOTj is the determined mean temperature value;
$MTTF_{Tx}$ is the predetermined second mean time to failure;
$MTTF_{Ty}$ is the predetermined first mean of time to failure;
$MTTF_i$ is the adjusted mean time to failure.

According to another aspect, the method comprises a step of measuring temperature in the electrical appliance, which may be performed cyclic or acyclic, and an update step of the mean value of temperature after each temperature measurement taken.

The invention also relates to a power supply module for a programmable controller comprising a microcontroller, said microcontroller being arranged for implementing the method as defined above for determining the mean time to failure of the power supply module.

The invention also relates to a programmable controller including a CPU module, at least one power supply module and one or more input/output modules, said power supply module being as defined above, is to say capable of implementing the method of determining its life before failure.

BRIEF DESCRIPTION OF THE DRAWINGS

By way of example only, the embodiments of the present disclosure will be described with reference to the accompanying drawing, wherein.

DETAILED DESCRIPTION

Figure 1:
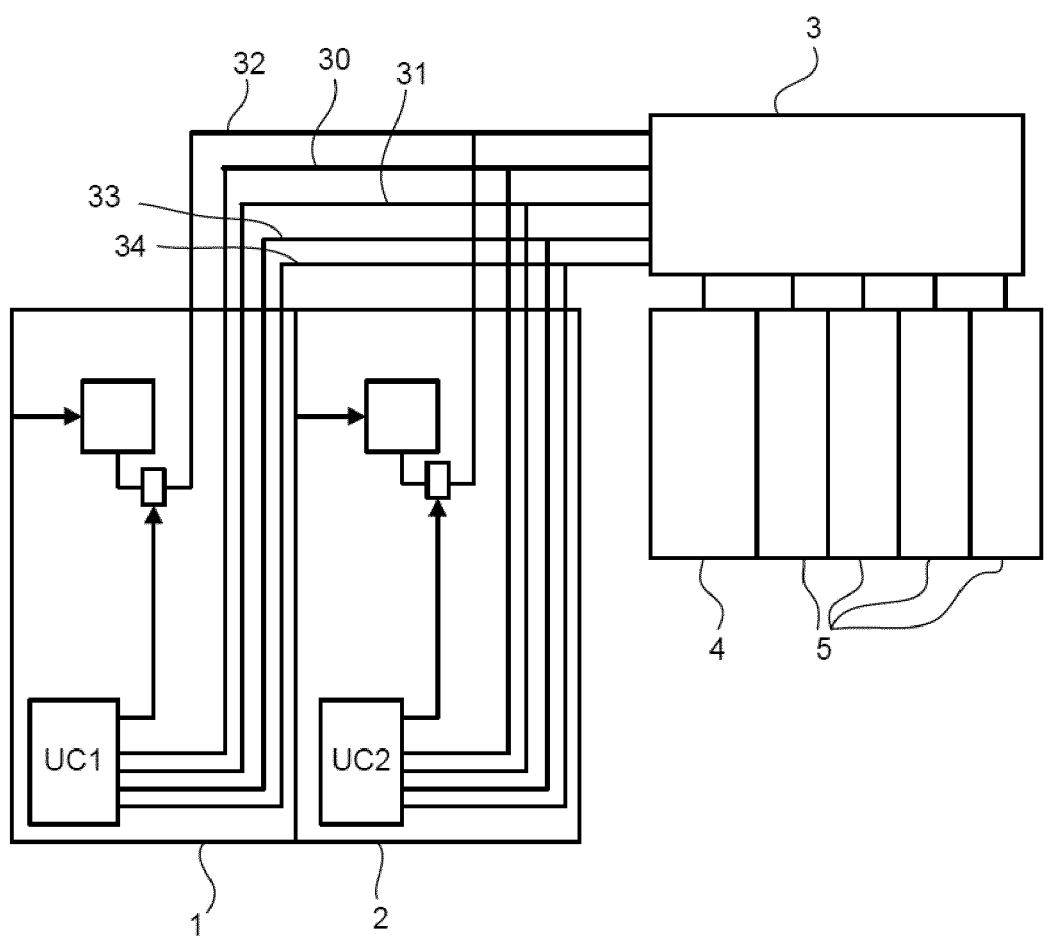
FIG. 1 schematically illustrates an architecture of a programmable controller.

FIG. 1 shows a programmable controller comprising several modules interconnected through a backplane bus 3 ("backplane"). The PLC includes a CPU module 4 and a plurality of I/O modules 5. To operate, the programmable controller comprises a power supply system 1, 2 providing at least one electrical supply voltage to all modules. The electrical supply voltage is applied to the backplane bus 3 by the electric power system.

An power supply system according to the invention comprises at least one power supply module 1. It may further comprise a second power module 2. The two modules 1, 2 are then associated in redundancy to always provide at least one electrical voltage necessary for the power supply of the PLC.

In this example, modules 1, 2, 4, 5 of the controller are all connected to the backplane bus 3 via a connector through which electrical power passes and data is exchanged between the modules. Through the bus 3, the modules communicate with each other using a communication protocol, for example 120 ("Inter Integrated Circuit").

The first power module 1 and the second power supply module 2 each include a microcontroller, designated respectively first UC1 microcontroller and second UC2 microcontroller. Each microcontroller UC1, UC2 includes a communication module arranged to send and receive messages through the bus 3 according to the chosen communication protocol.

In FIG. 1, backplane bus 3 includes:

Two communication lines 30, 31 for communication between the first and second two microcontrollers modules (I2C bus)

A power line 32 over which the two modules supply a voltage for powering the modules of the programmable controller, A line 33 on which each of the microcontroller systems may emit a signal to the CPU module to inform that it is no longer able to provide a redundancy power supply, A line 34 on which each microcontroller system informs the CPU module and other modules of the PLC they are able to provide the required supply voltage.

In each power supply module, the microcontroller UC1, UC2 is adapted to determine the operating time of the power supply module and the mean time to failure of the electronic circuit used in the module. Typically, this time is expressed in hours.

Figure 3:
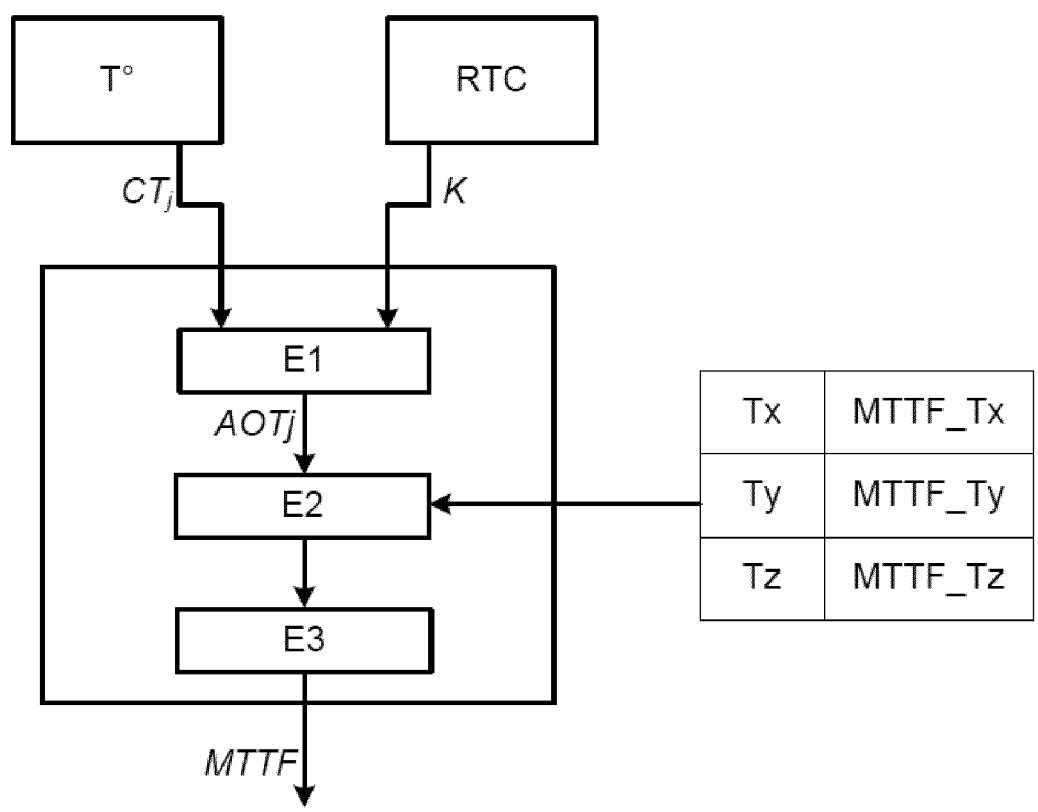
FIG. 3 schematically illustrates a method implemented by a microcontroller of a power supply module of a programmable controller for determining the mean time to failure of the module.

Thereto, it implements the algorithm shown in FIG. 3. A temperature sensor (T°) is positioned within the module and connected to the microcontroller to send at intervals, regular or irregular, the recorded temperature values.

The microcontrollers UC1, UC2 have stored for several temperature values (eg three temperatures Tx, Ty, Tz), several corresponding predetermined theoretical values of mean time to failure for the electronic circuit of the module. For each temperature value, the theoretical value is determined from the failure rate of each component present in the circuit.

For each temperature Tx, Ty, Tz, the mean time to failure values are obtained as follows:

$$MTTF\_Tx = \sum_{i=1}^{i=n} \frac{1}{\lambda_i}$$

$$MTTF\_Ty = \sum_{i=1}^{i=n} \frac{1}{\lambda'_i}$$

$$MTTF\_Tz = \sum_{i=1}^{i=n} \frac{1}{\lambda''_i}$$

Wherein $\lambda_i$, $\lambda'_i$, $\lambda''_i$ correspond to the failure rate of each component i (with i ranging from 1 to n components) of the electronic circuit of the module, at the respective temperature Tx, at temperature Ty and Tz temperature. The microcontroller thus stores MTTF_Tx, MTTF_Ty and MTTF_Tz for, in this example, three temperatures Tx, Ty, Tz.

Figure 2:
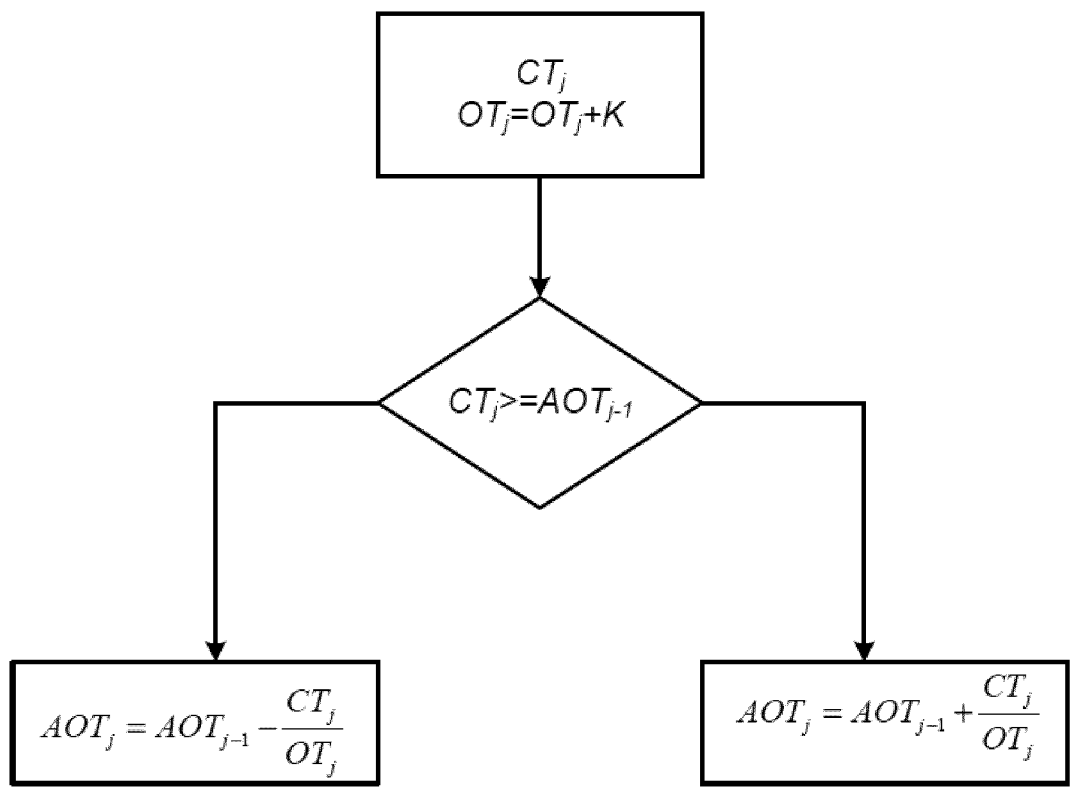
FIG. 2 is a flow diagram for updating a mean temperature value.

In operation, the microcontroller proceeds in the following manner:

Referring to FIG. 3, in a first step E1, the microcontroller determines a mean i.e. average value of temperature at which the module has operated during a determined and known operating time. The temperature is measured by the sensor T° and communicated to the microcontroller and the operating time is determined by means of a RTC. This average temperature is for example updated after each temperature reading. To update this average AOTj, the microcontroller may apply the algorithm shown in FIG. 2:

For each measured temperature, the microcontroller performs a step of comparing the CTj temperature which has been measured with the mean value AOTj−1 computed for the previous measurement:

If the measured CTj temperature is less than the previous average value AOTj−1 then the new average value is:

$$AOT_j = AOT_{j-1} - \frac{CT_j}{OT_j}$$

If the measured CTj temperature is higher than the previous average value AOTj−1, then the new average value is:

$$AOT_j = AOT_{j-1} + \frac{CT_j}{OT_j}$$

Returning to FIG. 3, in a second step E2, the microcontroller compares the mean temperature value AOTj determined during the preceding step to the temperatures Tx, Ty and Tz for each of which the microcontroller has stored a predetermined value of the mean time to failure MTTF_Tx, MTTF_Ty, MTTF_Tz.

The average value of temperature AOTj is thus positioned in a temperature range, including a first i.e. upper value and a second i.e. lower value. The microcontroller then selects for the higher value, the stored corresponding predetermined value of mean time to failure and for the lower value, the stored corresponding predetermined value of mean time to failure.

The predetermined values of mean time to failure MTTF_Tx, MTTF_Ty, MTTF_Tz correspond to a predetermined load condition of the electrical device. This load condition can take any value between 1 to 100%, such as 50%, 60%, 75%; 80%, 90% of the maximum amount of power that can be supplied by the power supply modules 1, 2.

In a third step E3, the microcontroller determines by interpolation the value of the operating time before failure of the module. For example, if one considers that the average temperature is in the range defined by Tx and Ty Ty greater than Tx, it applies the following formula:

$$MTTF_i = MTTF_{Tx} - (MTTF_{Tx} - MTTF_{Ty}) * \frac{(AOT_j - Tx)}{(Ty - Tx)}$$

Hence, an adjusted mean time to failure time (MTTF) of the electrical device is determined based on the mean temperature value (AOTj), the first (upper) value of the temperature range, the second (lower) value of the temperature range, and the first predetermined value of mean time to failure and the second predetermined value of mean time to failure.

Figure 4:
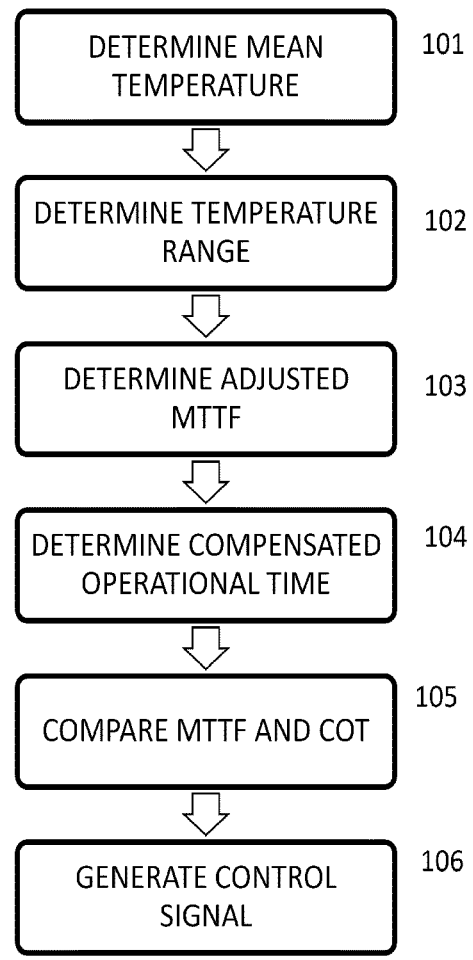
FIG. 4 is a flow diagram of the method according to the invention.

FIG. 4 shows a flow chart of the method as described thus far, extended with further steps for evaluating the resulting mean time to failure.

Again, is starts with determining a mean temperature value (AOTj) 101 at which the electrical device has operated during an operational time, followed by determining a temperature range 102 in which the determined mean temperature value (AOTj) is located, the range having a first temperature value which corresponds to a first predetermined value of mean time to failure and a second temperature value which corresponds to a second predetermined value of mean time to failure. And determining an adjusted mean time to failure time (MTTF) 103 of the electrical device based on said mean temperature value (AOTj), the first (upper) value of the temperature range, the second (lower) value of the temperature range, the first predetermined value of mean time to failure and the second predetermined value of mean time to failure.

In prior art solutions, a mean time to failure is compared to the operational time of the electrical device, the time lapsed during which the electrical device was up and running, regardless of its' performance.

According to the invention, the operational time is adjusted by determining a compensated operational time 104 based on operational time and actual load of the electrical device. The compensated operational time may then be compared 105 to the adjusted mean time to failure. And/or a time difference between the adjusted mean time to failure and the compensated operational time may be determined directly.

Depending on the outcome of the comparison or determined time difference, a control signal may be generated 106 when:
the compensated operational time exceeds a predetermined threshold; or
the determined time difference is below a predetermined threshold.

This predetermined threshold may be expressed as a percentage of the adjusted mean time to failure, such as 5%, 7% or 10% of time remaining till mean time to failure is reached. Or the predetermined threshold may be expressed as a time limit in hours of the adjusted mean time to failure, such as 100 hours; 1400 hours or 2000 hours till mean time to failure has lapsed.

For example, the control signal may be generated when the difference between compensated operational time and mean time to failure falls below 100 hours. Or, for example, the compensated operational exceeds 90% of the mean time to failure.

The control signal may be used to alert an operator or provide other alert signals. It may also be used to command a switching from one supply to another power supply, when for example the programmable controller is equipped with redundant power supplies. The control signal may also be used to indicate that one of the redundant power supplies is no longer able top perform its backup function.

Though the method in reference to FIG. 4 has been described above as consecutive steps, some of the above steps may be performed simultaneously to have intermediate results ready when required.

The manner in which the adjustment of operational time is determined will now be described in more detail. The electrical device is arranged to monitor the operational time and actual load and store values thereof at consecutive instants. Determining the compensated operational time includes determining a time interval between consecutive instants, adjusting the determined time interval by a compensation factor, and updating the compensated operational time with the determined adjusted time interval.

The compensation factor is based on the actual load during the determined time interval and the predetermined load condition. An electrical device is often not operated continuously at full maximum of its operating capabilities, to leave a certain margin in order to cope with peaks in the demand. Depending on the type of use application, this margin be designed to accommodate the expected variation in demand and hence may be narrow or large.

Furthermore, the compensation factor may be expressed as a function of the actual load during the time interval and the predetermined load condition. This function may be linear, proportional, quadratic, logarithmic or a combination thereof. All depending on the type of use application, In one example, wherein likewise the operational time and actual load are monitored by the electrical device and stored at consecutive instants, determining the compensated operational time may include applying the following expression:

$$COT_i = COT_{i-1} + (CT_i * CL_i)$$

Wherein:
$CT_i$ is a currently measured time interval that lapsed since a previous time interval measurement;
$CL_i$ is a compensation factor based on the actual load of the electrical device during the time interval and the predetermined load condition;
$COT_{i-1}$ is a previous value of the compensated operational time.

Figure 5:
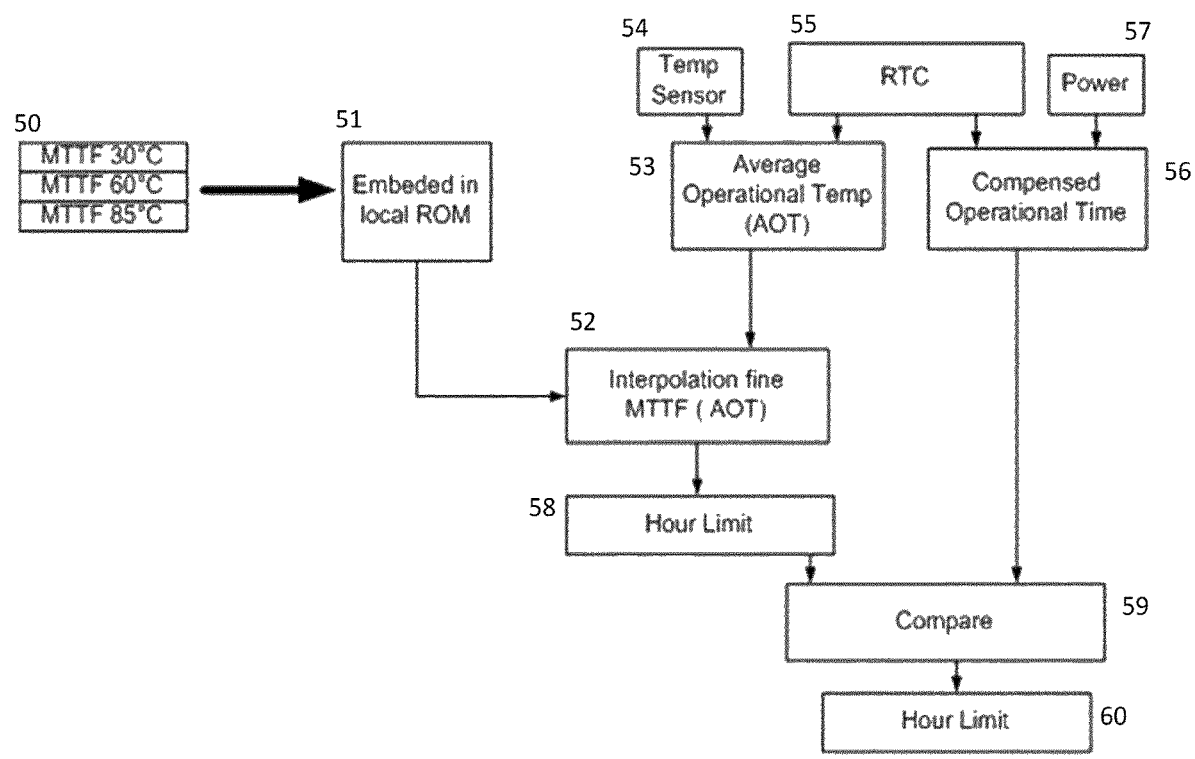
FIG. 5 schematically illustrates a block diagram of a power supply in accordance with the invention.

Referring to FIG. 5, a block diagram of control logic of a power supply in accordance with the invention is shown. Predetermined mean time to failure values 50 for different associated temperature values are stored in an embedded local ROM 51 in the power supply. These values are used to interpolate a mean time to failure for an average i.e. mean temperature value in block 52. The mean temperature value is obtained from block 53 which determines the mean temperature value based on temperature sensed by temperature sensor 54 and Real Time Counter 55. The Real Time Counter 55 also provides input to the compensated Operational time block 56, together with the monitored load of power 57. The compensated Operational time 56 is compared in comparison block 59 with the hour limit 58 derived from the interpolated and adjusted mean time to failure 52. The result of the comparison 59 is provided as an hour limit in block 60, in this example indicating the remaining hours till mean time to failure is reached.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

Furthermore, although exemplary embodiments have been described above in some exemplary combination of components and/or functions, it should be appreciated that, alternative embodiments may be provided by different combinations of members and/or functions without departing from the scope of the present disclosure. In addition, it is specifically contemplated that a particular feature described, either individually or as part of an embodiment, can be combined with other individually described features, or parts of other embodiments.

The invention claimed is:

1. A method for determining a mean time to failure of an electrical device, comprising:
   determining a mean temperature value at which the electrical device has operated during an operational time;
   comparing the determined mean temperature value to at least three previously stored temperature values and determining a temperature range in which the determined mean temperature value is located, the range is bounded by a first temperature value, among the at least three previously stored temperature values, which corresponds to a first predetermined value of mean time to failure and a second temperature value, among the at least three previously stored temperature values, which corresponds to a second predetermined value of mean time to failure;
   determining an adjusted mean time to failure time of the electrical device based on the mean temperature value, the first value of the temperature range, the second value of the temperature range, the first predetermined value of mean time to failure, and the second predetermined value of mean time to failure; and
   providing the first predetermined value mean time to failure and the second predetermined value of mean time to failure for a predetermined load condition of the electrical device which corresponds to a percentage of a maximum amount of power that can be supplied by a power supply of the electrical device, and
   wherein the determining the adjusted mean time to failure comprises:
   applying the following expression:

$$MTTF_i = MTTF_{Tx} - (MTTF_{Tx} - MTTF_{Ty}) * \frac{(AOT_j - Tx)}{(Ty - Tx)}$$

wherein:
   Tx is the second (lower) value of the temperature range;
   Ty is to the first (upper) value of the temperature range;
   AOTj is the determined mean temperature value;
   $MTTF_{Tx}$ is the predetermined second mean time to failure;
   $MTTF_{Ty}$ is the predetermined first mean of time to failure;
   $MTTF_i$ is the adjusted mean time to failure.

2. A method according to claim 1, further comprising:
   determining a compensated operational time based on operational time and actual load of the electrical device; and
   comparing the compensated operational time to the adjusted mean time to failure; and/or
   determining a time difference between the adjusted mean time to failure and the compensated operational time.

3. A method according to claim 2, further comprising:
   generating a control signal when:
   the compensated operational time exceeds a predetermined threshold; or
   the determined time difference is below a predetermined threshold.

4. A method according to claim 3, wherein the predetermined threshold is expressed as:
   a percentage of the adjusted mean time to failure; or
   a time limit in hours of the adjusted mean time to failure.

5. A method according to claim 2, wherein the operational time and actual load are monitored by the electrical device and stored at consecutive instants; and
   wherein the determining the compensated operational time comprises:
   determining a time interval between consecutive instants;
   adjusting the determined time interval by a compensation factor; and
   updating the compensated operational time with the determined adjusted time interval;
   wherein the compensation factor is based on the actual load during the determined time interval and a predetermined load condition.

6. A method according to claim 2, wherein the operational time and actual load are monitored by the electrical device and stored at consecutive instants; and
   wherein the determining the compensated operational time comprises applying the following expression:

$COT_i = COT_{i-1} + (CT_i * CL_i)$ wherein:

$CT_i$ is a currently measured time interval that lapsed since a previous time interval measurement;
   $CL_i$ is a compensation factor based on the actual load of the electrical device during the time interval and the predetermined load condition;
   $COT_{i-1}$ is a previous value of the compensated operational time.

7. A power supply module for a programmable controller comprising a microcontroller configured to implement the method according to claim 1.

8. A programmable controller, comprising:
   a central processing unit module;
   at least one input/output module; and
   at least one power supply module according to claim 7.

* * * * *